Patented Jan. 26, 1932

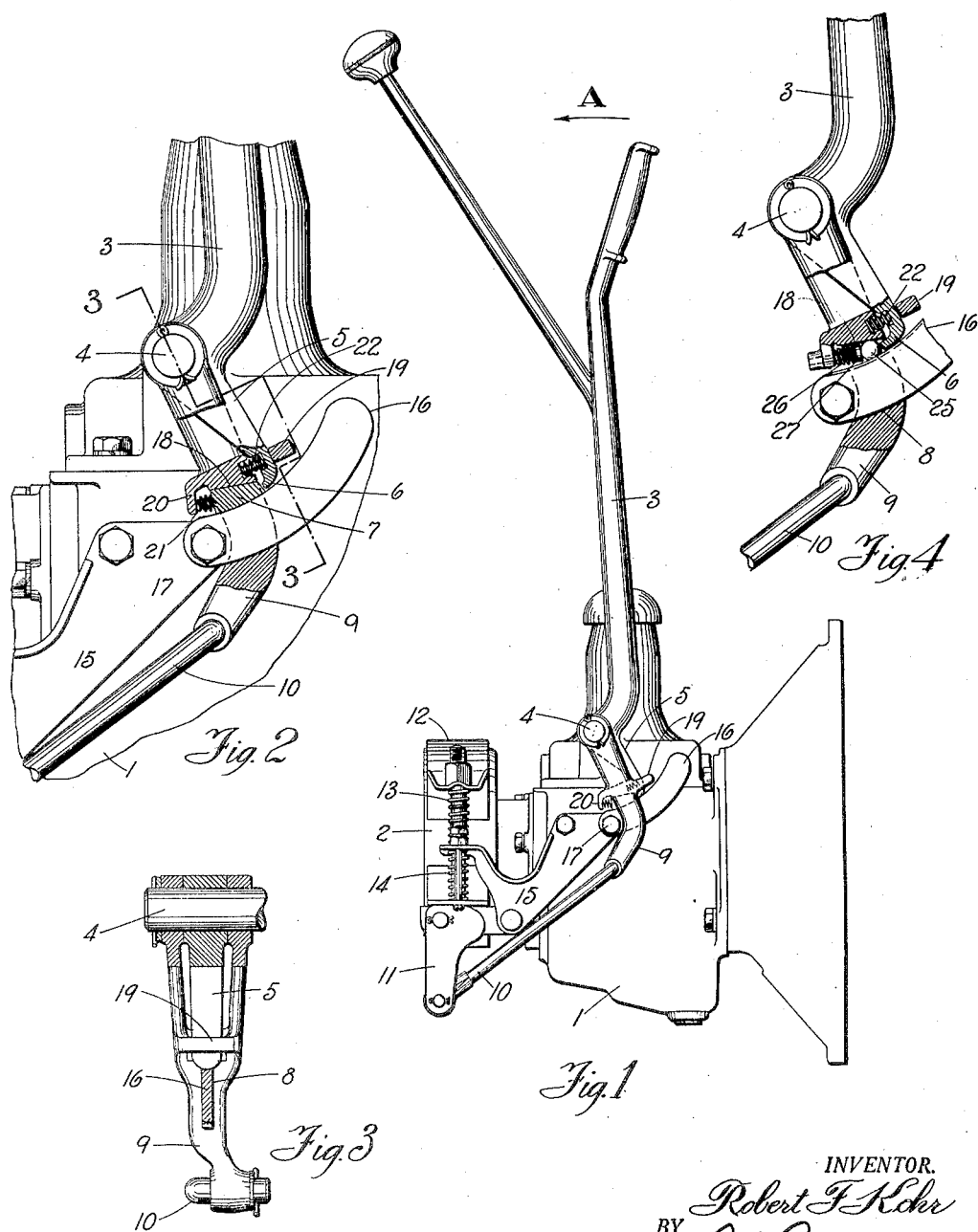

1,842,676

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed February 14, 1929. Serial No. 339,867.

This invention relates to brakes for motor vehicles and particularly to the control or operating means for the parking brake.

Heretofore it has been the common practice to use a control lever movable to operate a pawl or latch to engage with teeth formed in a segment or similar device to apply the parking brake. The control means heretofore used has had numerous objections and disadvantages due to the fact that the pawl does not always engage with the teeth and at times it is difficult to release the same after the brake has been set.

It is, therefore, the object of the present invention to provide a control lever and means operated thereby for frictionally engaging the segment preferably mounted on the transmission casing to maintain the parking brake in operative or engaging position.

A further object is to provide the control lever with a slot therein adapted to receive the segment and a wedge interposed between an edge of the slot and the segment for maintaining the lever in the desired position.

A further object is to provide means for releasing the wedge so that the control lever can be freely moved in one direction.

These being among the objects of the present invention, the same consists of certain features of construction and combinations of parts to be hereinafter described with reference to the accompanying drawings and then claimed, having the above and other objects in view.

Referring to the drawings which illustrate a suitable embodiment of the present invention, Figure 1 is a side elevation of a transmission casing and transmission brake showing the control lever connected therewith.

Figure 2 is an enlarged fragmentary side elevation of the transmission casing and brake control means, certain of the parts being broken away and in section to better show the invention.

Figure 3 is a section taken on the line 3—3 of Figure 2.

Figure 4 is a side elevation of a modified form of the brake control, certain of the parts being broken away and in section.

Referring to the numbered parts of the drawings in which like numerals refer to like parts throughout the several views, the transmission casing 1 is adapted to contain transmission gears (not shown) and support a brake drum 2. A brake control lever 3 is pivotally mounted on the pin 4 on the transmission casing 1 and is provided with a downwardly extending arm 5 having a nose portion 6 adapted to engage with a wedge 7 mounted in a slot 8 formed in a lever 9 pivotally mounted on the pin 4. A link 10 is connected at its one end to the lever 9 and at its opposite end to a cam 11, the cam 11 acting to contract the brake band 12 on the drum 2. The brake band 12 is normally held out of contact with the drum 2 by means of the springs 13 and 14 positioned on opposite sides of the bracket 15 secured to the transmission casing 1.

A segment 16 pivotally mounted at 17 on the bracket 15 is spaced from the transmission casing 1 and extends through the slot 8 formed in the lever 9. The upper edge of the slot 8 on the lever 9 has an inclined wall 18 which coincides with a face of the wedge 7, the opposite face of the wedge 7 being of substantially the same contour as the segment 16 so that the wedge will freely ride on the segment. The lever 9 has a forwardly extending arm or loop 19 which extends around the arm 5 for a purpose to be hereinafter described. The lever 9 also has a projecting portion 20 on the side opposite the loop 19 to provide an abutment for receiving the spring 21 which normally presses the wedge 7 into engagement with the segment 16 and the inclined face 18. A spring 22 positioned between the arm 9 and the arm 5 prevents the nose portion 6 from normally engaging with the wedge 7.

From the foregoing description of the parts it will readily be seen that as the lever 3 is moved in the direction of the arrow A that the arm 5 which engages with the loop 19 will move the arm 9 in an anti-clockwise direction and that the spring 21 will cause the wedge 7 to move therewith. As the lever 3 is moved in the direction above mentioned the same will operate through the link 10 and cam 11 to contract the brake band 12 on the drum 2 to set the parking brake.

When the lever 3 is moved in the opposite direction, the nose portion 6 will engage with the wedge 7 against the compression of the spring 22, causing the wedge to unseat from the inclined face 18 and the segment 16 whereby the brake band 12 will be released from the drum 2. It will thus be seen that as the lever 3 has moved in the direction of the arrow A that the wedge 7 will follow with the arm 9; that it will hold the respective members in the desired set position and that the movement of the lever 3 in the opposite direction will release the wedge 7 from the set position to thereby automatically expand the brake band 12 out of engagement with the drum 2 to release the parking brake.

In Figure 4 I have shown a modified form of my invention which comprises a ball 25 interposed between the segment 16 of the inclined face 18 of the slot 8 for accomplishing the same result as the wedge heretofore described. The ball 25 is maintained in the operative position by means of the spring 26 which presses the plunger 27 into engagement with the ball. The ball 25 is released upon movement of the nose portion 6 of the arm 5 into engagement therewith, the arm 5 being moved in such position against the compression of the spring 22.

Having thus described my invention, it is to be understood that formal changes may be made in the specific embodiment of the invention described without departing from the spirit and substance of the broad invention, the scope of which is commensurate with the appended claims.

What I claim is:

1. The combination with a transmission casing, of an arcuate segment mounted on one side thereof and spaced therefrom, a pivot pin on said casing, a brake operating handle pivotally mounted upon by said pin, a brake lever pivotally mounted upon by said pin and having a slot therein adapted to receive said segment, and a wedge operable by the movement of said brake operating lever in one direction to engage said segment and means whereby the movement of the brake operating lever in the opposite direction will disengage said wedge from said segment.

2. The combination with a transmission casing, of a brake operating lever, a brake lever, said levers having a common pivot on said casing, an arcuate segment pivotally supported on said casing extending through a slot in said brake lever, a wedge within the slot in said brake lever engageable with said segment upon movement of said brake operating lever in one direction and means whereby said wedge is disengaged from said segment upon movement of said brake operating lever in the opposite direction.

3. In combination with a transmission casing, of an arcuate segment mounted on one side thereof and spaced therefrom, a brake lever having a slot therein adapted to receive said segment, means positioned in said slot engaging said lever and segment for maintaining said lever in a set position, and a brake operating lever pivotally mounted on said casing engageable with said brake lever for moving the same in either of two directions, said brake operating lever releasing said means when said brake operating lever is moved in one direction.

4. The combination with a transmission casing, of an arcuate segment pivotally mounted on one side thereof, a brake lever pivoted on said casing and having a slot therein adapted to receive said segment, one of the walls of said slot being at an angle to the face of the segment adjacent thereto, a wedge engageable with the inclined edge of said slot and with said segment for maintaining said lever in a set position, and a brake operating lever having a common pivot with said brake lever, and having a part engageable with said wedge for releasing said wedge to permit said lever to be moved from its set position.

5. The combination with a transmission casing, of an arcuate segment pivotally mounted on one side thereof, a lever pivoted on said casing having a slot therein adapted to receive said segment, a second lever having a common pivot with said first lever for operating said first lever, and means positioned in said slot engaging a wall thereof and said segment for maintaining said first lever in a set position when moved by said second lever.

6. The combination with a transmission casing, of an arcuate segment pivotally mounted on one side thereof, a lever having a slot therein adapted to receive said segment pivotally mounted on said casing, one of the edge walls of said slot being at an angle to the adjacent edge of said segment and the opposed edge wall of said slot being substantially of the same contour as said segment, a wedge positioned in said slot having one face thereof of substantially the same contour as the edge of said segment and having the opposed face thereof inclined to seat on the inclined face of the wall forming said slot, a spring positioned between said wedge and said lever for forcing said wedge into said slot, a brake operating lever pivotally mounted on said casing for moving said first lever in either of two directions and having a finger portion for engaging the wedge member for releasing said wedge to permit movement of said lever in one of said directions.

Signed by me at South Bend, Indiana this 8th day of February, 1929.

ROBERT F. KOHR.